March 1, 1938. W. N. FANNING 2,109,475
CONTROL SYSTEM
Filed Dec. 24, 1935
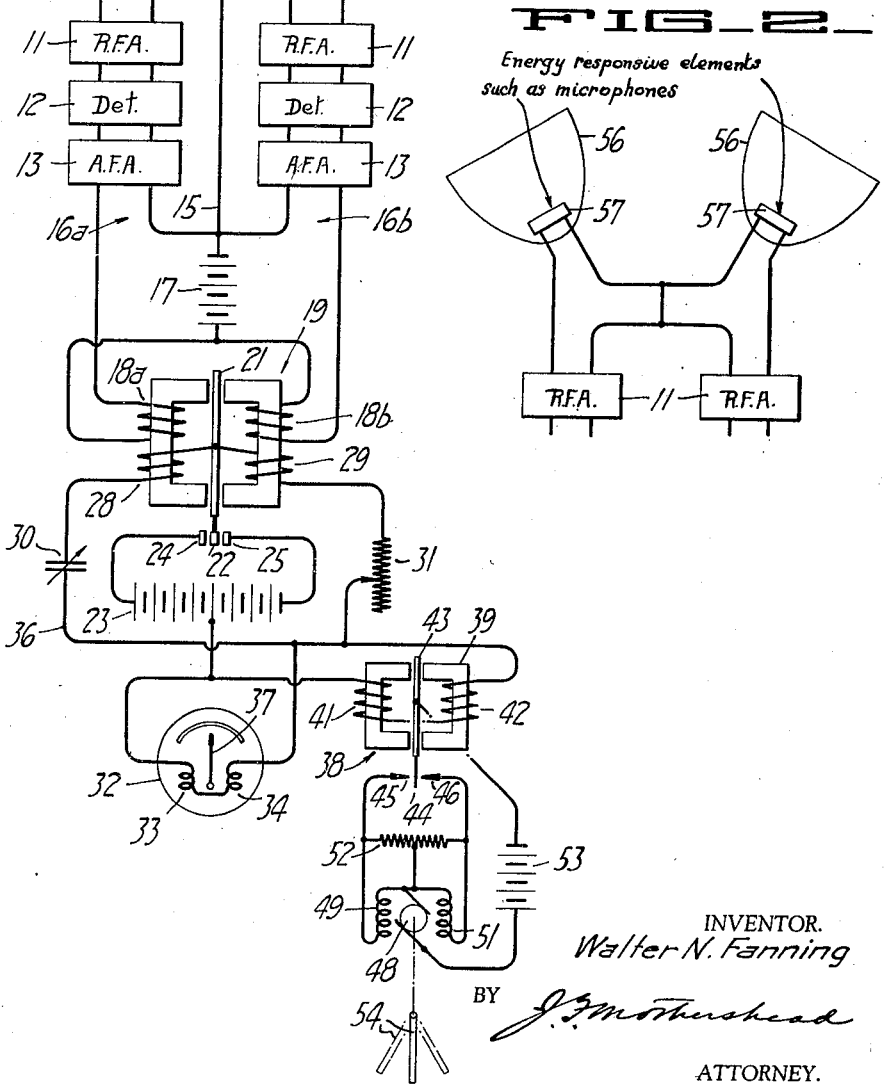
INVENTOR.
Walter N. Fanning
BY
J. F. Mothershead
ATTORNEY.

Patented Mar. 1, 1938

2,109,475

UNITED STATES PATENT OFFICE 2,109,475

CONTROL SYSTEM

Walter N. Fanning, Alameda, Calif.

Application December 24, 1935, Serial No. 55,977

3 Claims. (Cl. 250—11)

(Granted under the act of March 3, 1883, as amended April 30, 1928; 370 O. G. 757)

This invention relates generally to electrical systems utilizing wireless reception of energy, and is intended primarily to afford an indication or control in accordance with the direction from which the energy is received.

It is a general object of the invention to provide a system of the above character which will have a high degree of sensitivity without a sacrifice in reliability of operation.

Another object of the invention is to provide a practical system which can be employed to advantage for such purposes as to control the navigation or progress of airplanes, aerial torpedoes, land and marine craft, or submarine torpedoes, with respect to a remote source of energy.

Further objects of the invention will appear from the following description in which the preferred embodiments of the invention have been set forth in detail in conjunction with the accompanying drawing.

Referring to the drawing:

Fig. 1 is a circuit diagram, illustrating schematically a system incorporating the present invention, which utilizes the reception of radio energy.

Fig. 2 illustrates a modification, for the reception of sound, light, or heat energy.

Referring first to Fig. 1, I have shown a pair of directional loop antennas 10, which have the axes of their directional fields at an angle to each other. Suitable means is provided for separately amplifying and detecting the energy absorbed by these antennas, such as the radio frequency amplifiers 11, detectors 12, and audio frequency amplifiers 13. Suitable means, such as the variable condensers 14, are provided for tuning the two antennas to the radio signal energy. One terminal of each of the antennas is shown connected to a common neutral or grounded conductor 15, which is also connected to one side of each of the output circuits for the amplifiers 13.

All of the amplifiers and detectors referred to above are preferably of the electron relay type, with the output circuits for the amplifiers 13, being connected across the cathodes and anodes of their respective electron relays. A common "B" battery potential for the two amplifier output circuits 16a and 16b is represented by battery 17. These circuits also include the differential windings 18a and 18b, of a relay 19. This relay is provided with a pivoted magnetic armature 21, one end of which carries a contact 22.

For the purpose of polarizing relay 19, and in order to cause armature 21 to continuously vibrate or oscillate during periods when no signal energy is received by the antennas, or during periods when the signal energy received by the two antennas is equal, means are provided including a battery 23. The terminals of this battery are shown connected to the relay contacts 24 and 25, which cooperate with the armature contact 22. Supplemental windings 28 and 29 are provided for the relay 19, and these windings are connected in series with a circuit including the adjustable condenser 30 and resistance 31.

Device 32 represents a suitable instrument which will afford a visible response in accordance with operation of the relay 19. The windings 33 and 34 of this device are shown connected to the center of battery 23, and to the conductor 36, respectively. The pointer or indicating member 37 of the device 32, is adapted to swing in one direction or the other, dependent upon the direction of current flow through windings 33 and 34.

A power type of control means 38 can also be included in the system, in the same manner as the indicating device 32. Thus an apparatus 38 has been shown including a relay 39, having windings 41 and 42 which are also connected respectively to the center of battery 23, and to conductor 36. Relay 39 has a pivoted armature 43, the contact 44 of which cooperates with the stationary contacts 45 and 46. An electric motor 48 has series connected field windings 49 and 51, with one terminal of winding 49 connected to contact 45, and the corresponding terminal of winding 51 connected to contact 46. A resistance 52 is shunted across contacts 45 and 46, and has its mid point connected to the other terminals of the windings 49 and 51. A local source of current for motor 48, is represented by battery 53, which has its one terminal connected to the motor armature, and its other terminal connected to the relay armature 43. Motor 48 is shown having a mechanical connection to a member 54, which represents a member to be moved in opposite directions, as for example the rudder of an air craft, land vehicle or marine craft.

Operation of the system described above can now be briefly outlined as follows: Assuming that a radio transmitter is located along the direction line 1, at the point 8, and that the loop antennas 10 are at equal angles with respect to direction line 1, equal amounts of energy will be absorbed by the two antennas, with the result that the output currents from the two amplifiers 13, will be equal. Under such conditions equal current flow through the differential windings 18a and 18b, of the relay 19, will produce no effect upon the armature 21. The armature 21, however, will be in a continuous state of oscillation or vibration, due to the difference in reactance afforded by the current paths through condenser 30 and winding 28, as compared to the reactance afforded by resistance 31 and winding 29. This can be explained by pointing out that when contact 22 is in engagement with contact 24, current flow occurs from the left hand side of battery 23, through the windings 33 and 34 of device 32, and through the two paths afforded on the one hand by condenser 30 and winding 28, and on the other hand by resistance 31 and winding 29. However, the current flow through condenser 30 is only of momentary duration, until the same is fully charged, while current flow through resistance 31 and winding 29, reaches its maximum value over a relatively longer period of time. Thus as current flow through resistance 31 and winding 29 approaches or assumes its maximum value, armature 21 is moved to close contact 22 with respect to contact 25. Such movement is accelerated by discharge of current from condenser 30, immediately upon opening contacts 22 and 24. Upon closing contacts 22 and 25 this procedure is repeated, except that at such time current flow occurs from the right hand side of battery 23, through condenser 30, and resistance 31. The net result is that armature 21 is continuously oscillated or vibrated, with the speed of vibration being determined by the adjustment of condenser 30 and resistance 31. As long as armature 21 is vibrating it is evident that pointer 37 of device 32 is likewise vibrating across its medial or neutral position, unless movement of this pointer is damped to a substantial degree, in which event the pointer may remain substantially stationary. The armature 43 of relay 39 will likewise be continuously vibrated, with the result that torque upon the armature of motor 48 will be continuously reversed, and the member of rudder 54 will remain in the medial or neutral position.

Assuming now however that the positioning of antennas 10 is shifted with respect to the direction line 1, so that one antenna receives substantially more signal energy than the other, it is evident that more current flow will occur through one of the relay windings 18a and 18b, than through the other, with the result that the relay 19 will be overbalanced, thus causing contact 22 to be held into engagement with one or the other of contacts 24 and 25. This will obviously be immediately indicated by the pointer 37 of device 32, thus apprising the operator of the fact that the antennas are positioned unsymmetrically with respect to the source of energy. Likewise the armature 43 of relay 39 will cease to vibrate, and contact 44 will remain in engagement with one or the other of contacts 45 and 46, to cause the motor 48 to swing rudder 54 in one direction. If now the antennas 10 are repositioned in symmetrical relationship with respect to the direction line 1, as for example by changing the course of the craft on which the system is mounted, equal current flow will again be established through windings 18a and 18b, with the result that armature 21 will again commence to oscillate, and pointer 37, together with rudder 54, will be returned to neutral positions.

During times when no signal energy is received by either antennas 10, it is evident that either equal or no current flow will occur through windings 18a and 18b, and therefore armature 21 will continue to oscillate, the same as previously described when equal signal energy is received by the two antennas. By adjustment of condenser 30 and resistance 31, sensitivity of relay 19 can be varied in accordance with requirements.

It will be evident that the system described above can be employed for the reception of other forms of energy, in addition to radio signals. For example, as illustrated in Fig. 2, directional energy absorbing devices 56 are shown, which have their energy responsive elements 57 connected to the amplifiers 11, the same as in Fig. 1. Where the form of energy consists of sound waves, these devices may consist of parabolic sound reflectors, with the elements 57 being microphones disposed near the focal centers of the reflectors. Likewise if the energy consists of light rays or infra-red radiation, elements 57 may be suitable cells which are responsive to light or infra-red rays.

It will be apparent that my system is capable of a variety of applications. For example it can be employed to equip an airplane or aerial torpedo, or surface craft, in order to enable the same to proceed toward a radio transmitter. In place of the apparatus 38, other apparatus can be employed to perform desired mechanical operations, as for example a steering equipment of the gyroscopic type. When modified to be operated by sound waves, the system can be employed to equip a submarine torpedo, in order to direct the torpedo towards any noise area, such as the propellers of a moving vessel. The system can be utilized in conjunction with other radio controlled equipment, operating from a different frequency or frequencies, to enable additional automatic control. Likewise as applied to air craft, two systems of the character described can be employed, one having loops disposed in a horizontal plane, and the other having vertical loops. By employing the two systems to indicate the position of the craft with respect to a transmitter, or by employing the two systems for separately and automatically controlling the craft, movements of the craft can be completely directed by the controlling station.

The invention described herein, if patented, may be manufactured and used by or for the Government for governmental purposes without the payment to me of any royalty thereon.

I claim:—

1. In a wireless receiving system responsive to a remote source of signal energy, for application to a moving craft or body, at least two devices serving to absorb signal energy radiated from said source, said devices having directional characteristics whereby energy absorbed by the same is dependent upon their positioning relative to the source, relay means responsive to absorption of energy by either one or both of said devices, and power means controlled by said relay means and including a member movable in opposite directions from a medial position, said relay means including a vibratory element carrying a contact, means for locally energizing the relay means to maintain said element in continuous vibration during periods when neither device is receiving signal energy or during periods when said devices absorb equal amounts of signal energy from said source, and a pair of contacts cooperating with the contact of said vibratory element and serving to control the responsive means, whereby when more signal energy is absorbed by one of said devices than the other, said vibratory element is retained against vibration with the contact of the same in engagement with one or the other of said last named contacts.

2. In a wireless receiving system responsive to a remote source of signal energy, for application to a moving craft or body, at least two devices serving to absorb signal energy radiated from said source, said devices having directional characteristics whereby energy absorbed by the same is dependent upon their positioning relative to the source, magnetic relay means responsive to absorption of energy by either one or both of said devices, and power means controlled by said relay means and including a member movable in opposite directions from a medial position, said relay means including a pair of windings energized differentially responsive to energy absorbed by said devices, a vibratory magnetic armature carrying a contact, means for energizing the relay means to maintain the armature in continuous vibration during periods when said windings are not energized or during periods when said windings are equally energized, and a pair of contacts cooperating with the armature contact and serving to control the response means, whereby when more signal energy is absorbed by one of said devices than the other, said armature is retained against vibration with the armature contact in engagement with one or the other of said last named contacts.

3. In a radio receiving system responsive to a remote source of radio signal energy, for application to a moving craft or body, at least two antenna elements serving to absorb radio signal energy radiated from said source, said antenna elements having directional characteristics whereby energy absorbed by the same is dependent upon their positioning relative to the source, duplex electron relay means for separately detecting and amplifying the signal energy absorbed by said antenna elements, magnetic relay means connected to the outputs of said electron relay means and responsive to absorption of energy by either one of said antenna elements, and powers means controlled by said magnetic relay means and including a member movable in opposite directions from a medial position, said magnetic relay means including a pair of windings energized differentially responsive to detected signal energy supplied by said duplex electron relay means, a vibratory magnetic armature carrying a contact, and local means for energizing the relay to maintain the armature in continuous vibration during periods when said windings are not energized by detected signal energy, or during periods when said windings are equally energized by detected signal energy, and a pair of contacts cooperating with the armature contact and serving to control the response means, said windings when unequally energized by detected signal energy serving to retain said armature against vibration with the contact of the same in engagement with one or the other of said last named contacts.

WALTER N. FANNING.